Patented Mar. 9, 1926.

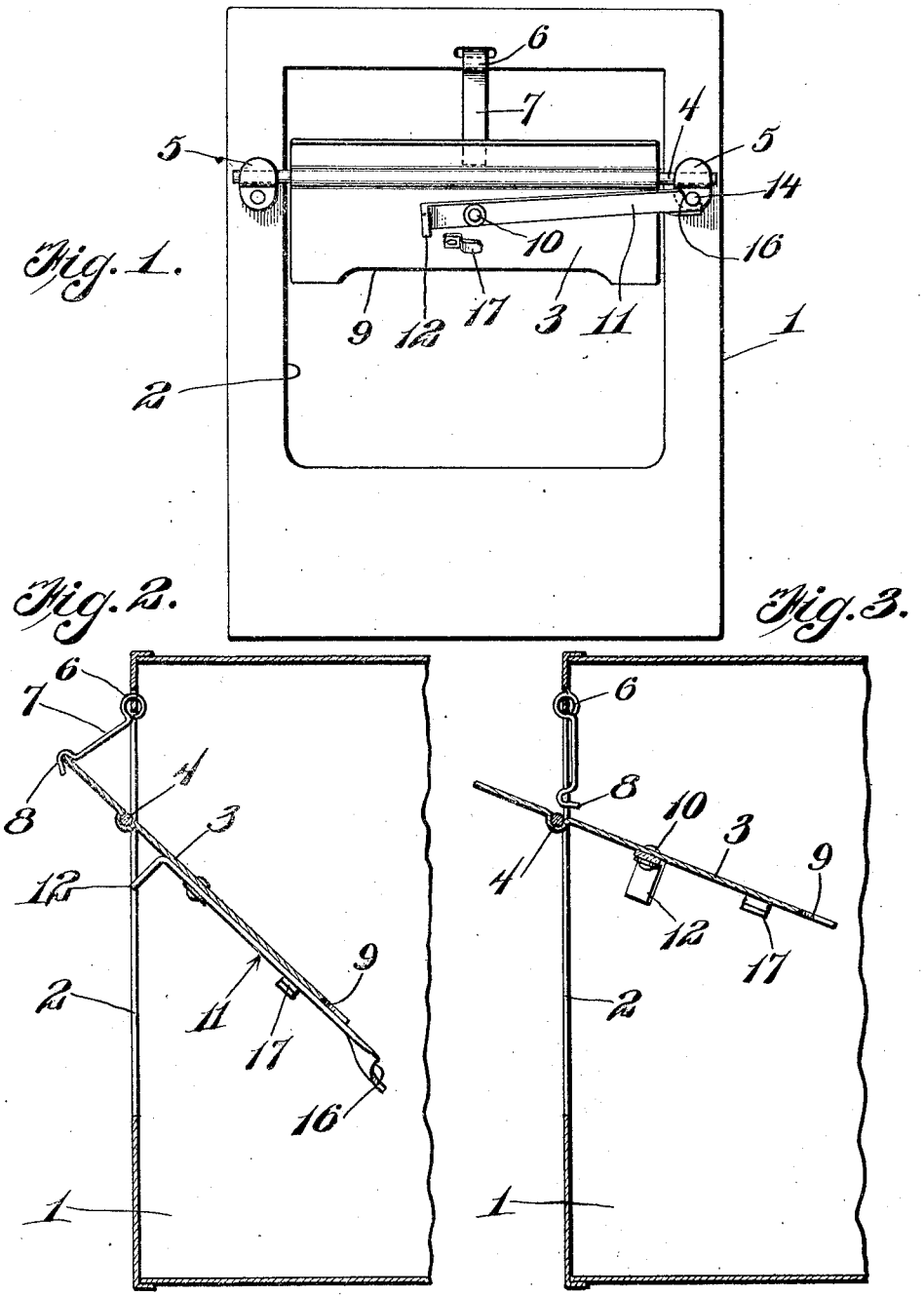

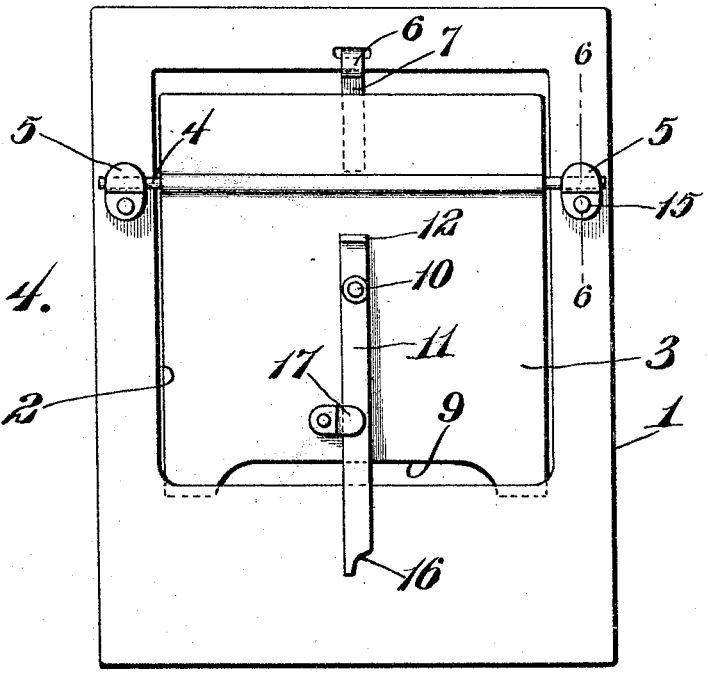
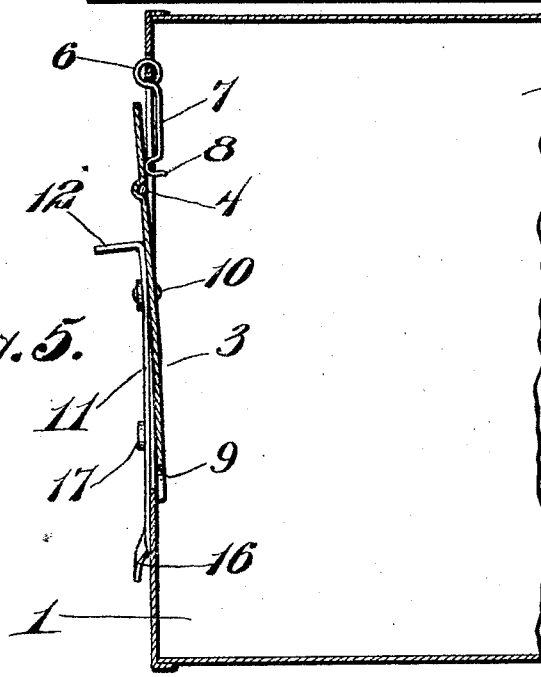
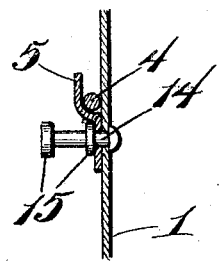

1,576,069

UNITED STATES PATENT OFFICE.

JOHN M. SARGEANT, OF ELMIRA, NEW YORK.

TRAP NEST.

Application filed January 22, 1925. Serial No. 4,068.

*To all whom it may concern:*

Be it known that I, JOHN M. SARGEANT, a citizen of the United States, residing at Elmira, in the county of Chemung and State of New York, have invented certain new and useful Improvements in Trap Nests, of which the following is a specification, reference being had to the accompanying drawing.

This invention relates to the class of traps and more particularly to that type known as trap nest, to be used in connection with poultry yards and the like.

An object of my invention is to provide a poultry trap nest which shall be not only simple and durable in construction, but reliable and efficient in operation, and one which can be manufactured and placed upon the market at a minimum cost.

A further object of my invention is to provide a trap nest of the character described, which is capable of being easily and quickly set in such a novel and peculiar manner as to be automatically sprung by the entrance of a fowl into the nest.

It is well known that trap nests have been provided for this purpose, but such nests as have heretofore been devised are either complicated in construction, therefore expensive in their manufacture, or are incapable of performing the functions required thereof, and are quite often accidentally sprung when it is not intended that they should be. Therefore, it is to overcome these and various other objectionable features that I have devised my improved nest which can only be operated by the entrance therein of a fowl.

It is also an object of the invention to provide a device of this kind with means whereby a locking device is employed to hold or lock the door in either an open or closed position The invention consists in the details of construction and in the combination and arrangement of the several parts of my improved trap nest whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in front elevation illustrating a trap having a door applied thereto constructed in accordance with an embodiment of my invention and in open position;

Figure 2 is a vertical sectional view taken through the structure illustrated in Figure 1 with certain of the parts in elevation and with the door releasably held in open position;

Figure 3 is a view similar to Figure 2 with the locking member in the position particularly illustrated in Figure 1;

Figure 4 is a view in elevation of the device as herein disclosed with the door in closed position;

Figure 5 is a vertical sectional view taken through the device as illustrated in Figure 4 with certain of the parts in elevation;

Figure 6 is a sectional view taken substantially on the line 6—6 of Figure 4, with certain of the parts in elevation.

As disclosed in the accompanying drawings, 1 denotes the body of the nest proper which is provided at one end with an entrance opening 2 adapted to be closed by the swinging door 3. The door 3 at a predetermined point below but in relatively close proximity to its upper edge has secured thereto a transversely disposed rod 4 extending beyond opposite sides thereof, the extended portions of the rod 4 seating within the upwardly facing clips 5 secured to the outer face of said end wall at opposite sides of the opening 2. The rod 4 and clips 5 provide means whereby the door 3 may be readily mounted in applied position or removed when required.

Pivotally connected, as at 6, with the end wall of the nest at a point slightly above the opening 2 at the transverse center thereof is a trigger 7. This trigger 7 is of desired length and is provided at its outer end with a downwardly or inwardly facing hook member 8 adapted to engage from above the upper marginal portion of the door 3 when the same is in its open position as particularly illustrated in Figure 2. When a fowl enters the nest 1 through the opening 2 the back of the fowl will contact with the lower or free end portion of the door 3 and raise the same sufficiently to free the hook member 8 of the trigger 7 from said door, so that said door by gravity will promptly drop to its closed position.

As herein disclosed, the door 3 is of such dimensions as to have its lower marginal portions terminate slightly below the lower edge of the entrance opening 2 whereby the swinging movement of the door to its closed position is limited by contact of said door with the end wall. The intermediate part of said lower portion of the door, however, is preferably cut away, as at 9, to facilitate the entrance within the nest 1 of a fowl.

Pivotally connected, as at 10, at substantially the transverse center of the door 3 is an end portion of an elongated bar 11, said bar being of a length to extend beyond the lower margin of the door 3 for contact with the adjacent end wall to maintain the same in its closed position. The extremity of the bar 11 above the pivotal connection 10 is provided with an outstanding extension 12 to provide means whereby the bar 11 may be readily and conveniently adjusted as desired.

The member 14 holding one of the clips 5 in applied position is extended outwardly of the clip and provided with the spaced heads 15 between which is adapted to be engaged the outer extremity of the bar 11, as is particularly illustrated in Figure 1, to hold the door 3 in its open position, said extremity of the bar 11 being recessed, as at 16, to facilitate such contact or engagement. It will be understood that there will be sufficient looseness for a jar at the pivotal connection 10 to facilitate the requisite engagement of the bar 11 between the space heads 15.

The bar 11 is adapted to overlie the outer face of the adjacent end wall of the nest so that once the trap is sprung it will be impossible for another bird to force its way into the nest.

As is herein disclosed, the door 3 adjacent its lower marginal portion is provided with a transversely disposed clip 17 with which the bar 11 is adapted to engage whereby said bar is prevented from swinging downwardly beyond a vertical center. This is of particular importance in the event the door 3 should be of a circular type.

In actual practice, traps are often sprung accidentally by birds alighting on the top of the nest or the conventional alighting shelf, not shown, causing a jar which accidentally springs the trap. By the use of the bar 11 this is avoided.

From the foregoing description it is thought to be obvious that a trap nest constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. In combination with a wall provided with an opening, a door for said opening, means for supporting said door for swinging movement in a vertical direction, an outstanding part carried by the wall at one side of the opening, and a bar pivotally connected with the door, an end portion of the bar contacting with the outstanding part to hold the door in a raised position, said bar being maintained in contact with said part by the weight of the door and bar.

2. In combination with a wall provided with an opening, a door for said opening, means for supporting said door for swinging movement in a vertical direction, an outstanding part carried by the wall at one side of the opening, and a bar pivotally connected with the door, an end portion of the bar contacting with the outstanding part to hold the door in a raised position, said bar being of a length to have one end portion extend beyond the lower margin of the door.

3. In combination with a wall provided with an opening, a door for said opening, means for supporting said door for swinging movement in a vertical direction, an outstanding part carried by the wall at one side of the opening, a bar pivotally connected with the door, an end portion of the bar contacting with the outstanding part to hold the door in a raised position, and means for limiting the swinging movement of the bar in one direction beyond substantially the vertical.

4. In combination with a wall provided with an opening, a door for said opening, means supporting said door for swinging movement, a trigger coacting with the wall and the door for holding the door in open position, a bar pivotally connected with the door, and an outstanding part carried by the wall at one side of the opening, said bar contacting said part to hold the door in a raised position.

5. In combination with a wall provided with an opening, a door for said opening, means for supporting said door for swinging movement in a vertical direction, a bar pivotally connected with the door below its support, an outstanding part carried by the wall at one side of the opening and below the support for the door, an end portion of the bar contacting with the outstanding part to hold the door in a raised position.

In testimony whereof I hereunto affix my signature.

JOHN M. SARGEANT.